(No Model.)

J. J. TYLOR.
ROTARY WATER METER.

No. 402,699. Patented May 7, 1889.

Witnesses

Joseph John Tylor
Inventor

UNITED STATES PATENT OFFICE.

JOSEPH JOHN TYLOR, OF LONDON, ENGLAND.

ROTARY WATER-METER.

SPECIFICATION forming part of Letters Patent No. 402,699, dated May 7, 1889.

Application filed August 14, 1888. Serial No. 282,726. (No model.)

*To all whom it may concern:*

Be it known that I, JOSEPH JOHN TYLOR, civil engineer, a subject of the Queen of Great Britain, residing at 2 Newgate Street, in the city of London and Kingdom of Great Britain, have invented certain new and useful Improvements in Liquid-Meters, of which the following is a specification.

My invention relates to improvements in that class of liquid-meters known as "inferential," in which the quantity of liquid passed through a pipe in a given time is registered by the revolution of a wheel or fan set in motion by the stream of liquid, and has special reference to that kind of meter for which a patent was granted to me, bearing date December 21, A. D. 1886, No. 354,614.

Figure 1:
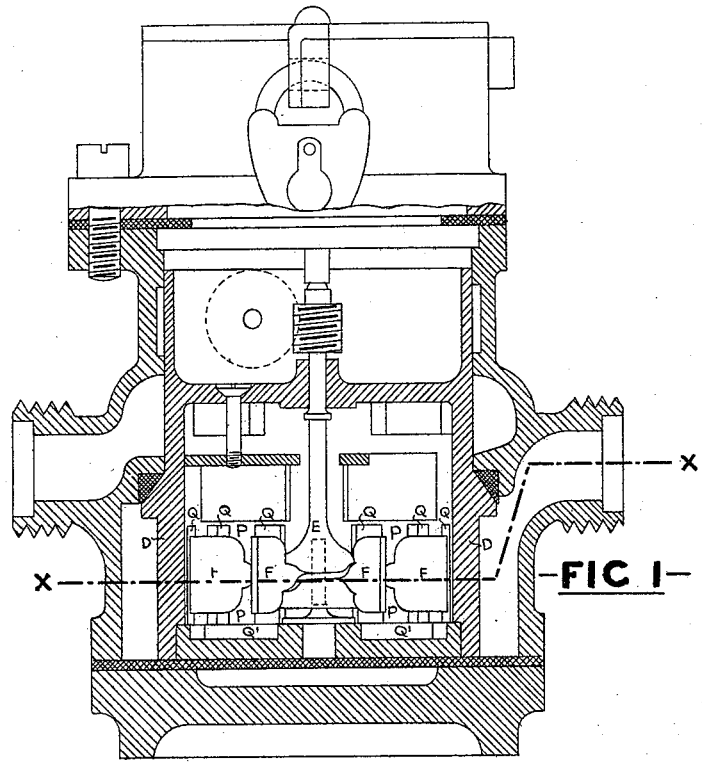
Figure 3:
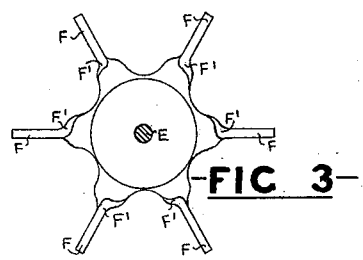
Figure 2:
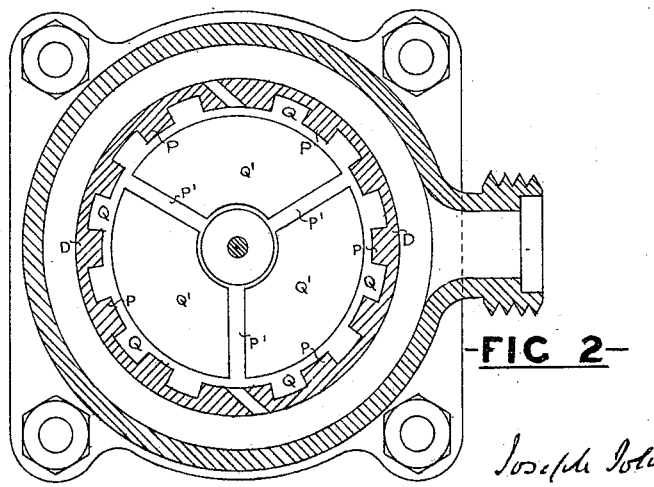

Figure 1 of the accompanying drawings represents a vertical sectional elevation of my improved meter. Fig. 2 is a horizontal section on line $x\ x$ of Fig. 1, and Fig. 3 is a separate plan view of the measuring fan or wheel.

The general construction of meter is similar to that shown and described in the specification and drawings of my before-mentioned patent; but, as has hitherto sometimes been done, I form the internal surface of the circular chamber D, in which the registering fan or wheel F revolves, with a series of corrugations or alternate projections or fillets, P, and hollows or grooves Q, (see Figs. 1 and 2,) which hold or retain the outer layer or film of liquid in the fan-chamber in such manner that it has a retarding, restraining, or brake-like effect upon the revolving wheel or fan F, whereby the latter is prevented from moving at a speed which is inconsistent with the quantity of liquid passing through the meter.

The corrugations, projections, or fillets and the hollows or grooves may be formed on the cylindrical sides of the fan-chamber, as shown at P Q in Figs. 1 and 2, or on the bottom thereof, as shown at P' Q', Fig. 2, or on both sides and bottom, and they may be placed in a vertical or radial direction, or at any suitable angle with reference to the direction of the current or stream of liquid.

Meters constructed with circular fan-chambers having a number of projections or fillets and hollows or grooves on the surface thereof, as above described, enable the current of liquid passing through the meter to act centrally upon the measuring-fan, whereby the side action and consequent wear and tear on the toe-pieces occurring in meters with oval cases having only two brake-surfaces is obviated, the brake action due to such projections and hollows being equal at every point of the circumference. The measuring-fans of meters so constructed may also be run much faster and with less noise than those of the ordinary construction. This increased speed of measuring-fan gives a greater range of correct registration.

To obviate the tendency of the measuring fan or wheel to be raised off its toe-piece or lower bearing, or to be pressed down thereon, by reason of all the roots or parts of the blades F near the axis E being sloped in one direction, I form the roots or parts of the blades near the axis so that each such root or part slopes alternately in an opposite direction, as shown clearly at F' in Fig. 3, in which it will be seen that the root F' of each blade F slopes in a direction opposite to that of each adjacent blade.

I claim—

A measuring fan or wheel of a meter with the roots or parts of the blades near the axis sloping alternately in opposite directions, as and for the purpose specified.

In testimony that I claim the foregoing as my invention I have signed my name in presence of two subscribing witnesses.

JOSEPH JOHN TYLOR.

Witnesses:
PHILIP BRIGHT,
   *2 Newgate Street, London.*
W. A. SMITH,
   *115 Cannon Street, London.*